(12) United States Patent
Murakami et al.

(10) Patent No.: US 10,291,104 B2
(45) Date of Patent: May 14, 2019

(54) APPARATUS FOR COOLING AN ELECTRIC ROTATING MACHINE

(71) Applicant: Mitsubishi Electric Corporation, Tokyo (JP)

(72) Inventors: Tadashi Murakami, Tokyo (JP); Yukitaka Sakata, Tokyo (JP); Yoshiaki Kitta, Tokyo (JP); Katsunari Takagi, Tokyo (JP); Koichi Ojima, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 14/718,546

(22) Filed: May 21, 2015

(65) Prior Publication Data
US 2016/0294257 A1 Oct. 6, 2016

(30) Foreign Application Priority Data
Apr. 3, 2015 (JP) ................. 2015-076482

(51) Int. Cl.
*H02K 5/20* (2006.01)
*H02K 9/19* (2006.01)
*H02K 9/193* (2006.01)

(52) U.S. Cl.
CPC .............. *H02K 9/19* (2013.01); *H02K 5/20* (2013.01); *H02K 9/193* (2013.01)

(58) Field of Classification Search
CPC ........... H02K 1/32; H02K 1/325; H02K 9/00; H02K 9/005; H02K 9/19; H02K 9/193; H02K 5/20
(Continued)

(56) References Cited

U.S. PATENT DOCUMENTS 5,156,579 A * 10/1992 Wakuta .............. H02K 9/19
                                                180/65.51
2009/0283344 A1 * 11/2009 Arnold ............... B60K 6/26
                                                180/65.22
(Continued)

FOREIGN PATENT DOCUMENTS

JP          56-139367 A        3/1980
JP          2011-254580 A     12/2011
(Continued)

OTHER PUBLICATIONS

Communication dated Dec. 8, 2015 from the Japanese Patent Office in counterpart application No. 2015-076482.

*Primary Examiner* — Thomas Truong
*Assistant Examiner* — Minki Chang
(74) *Attorney, Agent, or Firm* — Sughrue Mion, PLLC; Richard C. Turner

(57) ABSTRACT

An electric rotating machine that can raise the utilization efficiency of cooling oil is obtained. In an rotation axle, there are provided an oil flow path having a predetermined length from an end of the rotation axle and a flow path hole that communicates with the oil flow path and has an opening toward the inside of the electric rotating machine; a supporting member includes a cylinder section and a disk section that partitions the cylinder section in the axis direction, and a discharging hole is provided at an end of the cylinder section; between the flow path hole and the discharging hole, there is provided a partition plate that encloses a space formed by the supporting member and the rotation axle and guides cooling oil traveling from the flow path hole to the inside of the electric rotating machine to the discharging hole.

14 Claims, 4 Drawing Sheets

(58) Field of Classification Search
USPC ............... 310/52, 54, 58, 59, 60 R, 61, 60 A
See application file for complete search history.

(56) References Cited

U.S. PATENT DOCUMENTS

| | | | |
|---|---|---|---|
| 2010/0141062 A1* | 6/2010 | Chamberlin | H02K 9/19 310/54 |
| 2012/0080286 A1* | 4/2012 | Kasuya | B60K 6/40 192/113.3 |
| 2013/0334912 A1* | 12/2013 | Tokunaga | H02K 9/19 310/54 |
| 2014/0077631 A1* | 3/2014 | Watanabe | H02K 9/19 310/54 |
| 2015/0027273 A1* | 1/2015 | Iwase | H02K 5/225 74/665 B |

FOREIGN PATENT DOCUMENTS

| | | | | |
|---|---|---|---|---|
| JP | 2012-100458 A | 5/2012 | | |
| JP | 2012-100477 A | 5/2012 | | |
| JP | WO 2013157374 A1 * | 10/2013 | ............ | H02K 5/225 |

* cited by examiner

APPARATUS FOR COOLING AN ELECTRIC ROTATING MACHINE

BACKGROUND OF THE INVENTION

Field of the Invention

The present invention relates to an electric rotating machine and more particularly to a structure for cooling an electric rotating machine.

Description of the Related Art

To date, as a structure for cooling an electric rotating machine, for example, Japanese Patent Application Laid-Open No. 2012-100477 (Patent Document 1) has disclosed a cooling structure, for an electric rotating machine, that is provided with a rotor having a rotor iron core and a supporting member and cools the rotor; the rotor iron core is situated at the outer circumference side of a rotation axle and in which permanent magnets are mounted, and the supporting member couples and supports the rotor iron core and the rotation axle. An oil flow path for supplying cooling oil to the center axis of the rotation axle is provided in the electric rotating machine; the supporting member is provided with an outer cylinder unit fixed to the inner circumferential surface of the rotor iron core and a disk-shaped supporting body that partitions the outer cylinder into two portions in the axis direction of the rotation axle. There is provided an oil supply means for supplying oil to the inner circumferential surface of one of the two portions of the outer cylinder unit that is partitioned into two portions by the supporting body; through-holes that penetrate the supporting body are provided in the mounting portion, for the outer cylinder unit, of the supporting body.

In the structure disclosed in Patent Document 1, the oil supply means jets (supplies) cooling oil, which has passed through the oil flow path provided along the center axis of the rotation axle, to the inner circumferential surface of the outer cylinder unit so that the permanent magnets embodied in the rotor iron core are cooled.

[Patent Document 1] Japanese Patent Application Laid-Open No. 2012-100477

In the foregoing cooling structure for an electric rotating machine, cooling oil is jetted (supplied) by centrifugal force onto the inner circumferential surface of the outer cylinder unit; therefore, there has been a problem that in some cases, the cooling oil cannot be jetted onto a target place and hence the cooling efficiency of the electric rotating machine is lowered. In particular, as the rotation speed of the rotor becomes higher, airflow in the electric rotating machine is intensified; thus, the foregoing phenomenon becomes more conspicuous.

SUMMARY OF THE INVENTION

The present invention has been implemented in order to solve the foregoing problem; the objective thereof is to obtain an electric rotating machine that can raise the utilization efficiency of cooling oil in a structure in which cooling oil passes through the rotation axle of the electric rotating machine so as to cool the electric rotating machine.

An electric rotating machine according to the present invention is provided with a rotor having a rotation axle, a rotor iron core that is situated at an outer circumference of the rotation axle and in which magnets are mounted, and a supporting member that is disposed at an outer circumference of the rotation axle and couples and supports the rotor iron core with the rotation axle; in the rotation axle, there are provided an oil flow path having a predetermined length from an end of the rotation axle and a flow path hole that communicates with the oil flow path and has an opening toward the inside of the electric rotating machine; the supporting member includes a cylinder section and a disk section that partitions the cylinder section in the axis direction, and a discharging hole is provided at an end of the cylinder section; between the flow path hole and the discharging hole, there is provided a partition member that encloses a space formed by the supporting member and the rotation axle and guides cooling oil traveling from the flow path hole to the inside of the electric rotating machine to the discharging hole.

With regard to a structure in which cooling oil passes through the rotation axle of an electric rotating machine so as to cool the electric rotating machine, the present invention makes it possible that the utilization efficiency of the cooling oil is raised and hence a high-cooling-performance electric rotating machine is obtained.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, preferred embodiments of an electric rotating machine according to the present invention will be explained with reference to the drawings.

Embodiment 1

Figure 1:
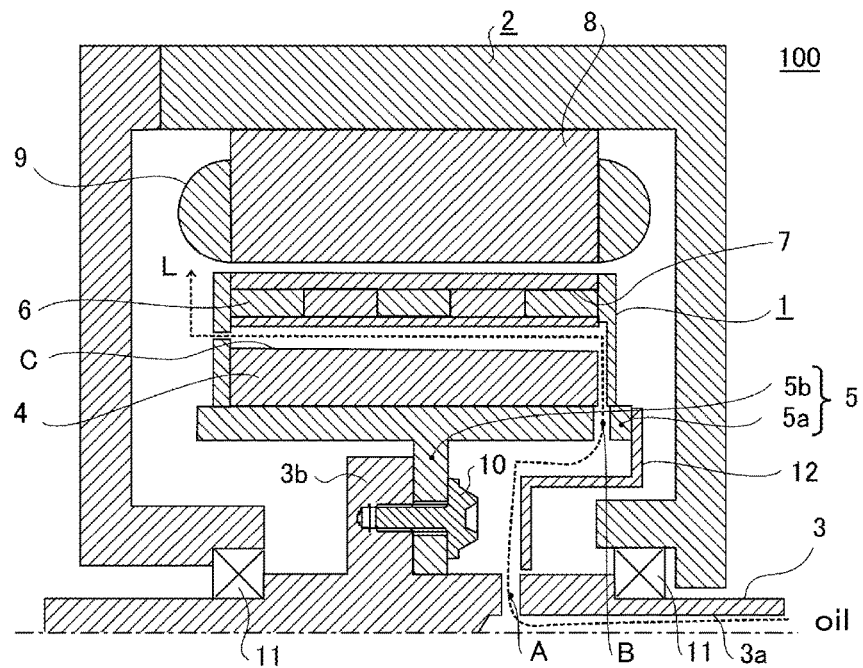
FIG. 1 is a cross-sectional view illustrating the configuration of an electric rotating machine according to Embodiment 1 of the present invention.

FIG. 1 is a cross-sectional view illustrating the configuration of an electric rotating machine according to Embodiment 1 of the present invention. As illustrated in FIG. 1, an electric rotating machine 100 has a rotor 1 and a stator 2; the outer circumference of the rotor 1 faces the inner circumference of the stator 2 through a predetermined gap. The rotor 1 has a rotation axle 3, a rotor iron core 4, a supporting member 5 that couples and supports the rotation axle 3 and the rotor iron core 4, and magnets 6. The supporting member 5 is disposed on the outer circumference of the rotation axle 3; the rotor iron core 4 is fixed to the outer circumference of the supporting member 5 in a fitting manner. In addition, the magnets 6 are arranged in a magnet containing hole 7 formed in the rotor iron core 4.

The stator 2 has a stator iron core 8 formed in the shape of a ring and a stator winding 9 wound around the stator iron core 8. In the rotation axle 3, there are provided an oil flow path 3a having a predetermined length from an end thereof and an flow path hole A that communicates with the oil flow path 3a and opens to the inside of the electric rotating machine 100. The supporting member 5 has a cylinder section 5a and a disk section 5b that partitions the cylinder section 5a into two portions in the axis direction; a discharging hole B for cooling oil is provided at one end of the cylinder section 5a; a screw 10 fixes the disk section 5b to a protruding section 3b of the rotation axle 3. As indicated by an arrow L in FIG. 1, the cooling oil passes through the flow path hole A and the discharging hole B, passes through a flow path C formed adjacent to the magnet containing hole 7 of the rotor iron core 4, and then is discharged in the radial direction of the electric rotating machine 100. The stator 2 supports the rotation axle 3 by means of a bearing 11, and the rotor 1 is supported pivotably with respect to the stator 2.

Because in the electric rotating machine 100 configured as described above, the rotor 1 has the supporting member 5, the distances to the magnets 6 and the stator winding 9 that need to be cooled become long; therefore, there has been a problem that the cooling oil that passes through the oil flow path 3a and the flow path hole A formed in the rotation axle 3 and then is discharged does not reach the discharging hole B and hence is wasted.

Moreover, there has been a problem that when the electric rotating machine 100 rotates at a high speed, an air flow occurs inside the electric rotating machine 100 and hence the cooling oil is dispersed. In particular, in the case of an electric rotating machine to be mounted in an electric automobile or a hybrid automobile, a high coolability is required; thus, there has been a problem that when the temperature rise is large, the magnet 6 is demagnetized or it is required to reduce the current density and hence the performance is deteriorated.

Accordingly, in Embodiment 1, a partition member, e.g., a partition plate 12 is provided in the rotor 1 so that the space formed by the supporting member 5 and the rotation axle 3 is enclosed. One end of the partition plate 12 is welded to the end, of the supporting member 5, that is situated at the side of the discharging hole B formed in the cylinder section 5a and the other end thereof is spaced a small gap apart from the rotation axle 3 so that the cooling oil is guided from the flow path hole A to the discharging hole B. In FIG. 1, the partition plate 12 is formed in such a way that the cross section thereof is in the shape of a crank; however, as long as the cooling oil can be guided from the flow path hole A to the discharging hole B, the cross section thereof may be formed in any shape; for example, the cross section thereof may be in the shape of an arc or a straight line.

The electric rotating machine 100 according to Embodiment 1 is configured in such a manner as described above; thus, without loss, the partition plate 12 delivers to the discharging hole B the cooling oil that travels along the oil flow path 3a formed in the rotation axle 3, passes through the flow path hole A, and is discharged through the flow path hole A. Accordingly, there can be solved the problem that when the electric rotating machine 100 rotates at a high speed, the cooling oil disperses; thus, the magnets 6 and the stator winding 9 that need to be cooled can effectively be cooled.

Moreover, because the partition plate 12 that encloses the supporting member 5 and the rotation axle 3 is mounted, as a separate member, in the rotor 1, the shapes of the supporting member 5 and the rotation axle 3 become simple and hence the machining costs are reduced; in addition, the forging blank materials for the supporting member 5 and the rotation axle 3 can be downsized and hence the workability is raised; thus, the present invention contributes to reducing the cost of the electric rotating machine 100.

Furthermore, in comparison with a structure in which an oil path for obtaining the similar effect is provided in the supporting member 5 and the rotation axle 3, the present invention makes it possible to save the weight of the electric rotating machine 100; in addition, because being provided in the rotor 1, the partition plate 12 rotates in synchronization with the rotor 1 and hence the clearance between the rotation axle 3 and the partition plate 12 can be reduced.

Moreover, cooling oil can be stored in the space enclosed by the cylinder section 5a and the disk section 5b of the supporting member 5, so that the cooling efficiency is raised; in addition, centrifugal force makes the cooling oil, which passes through the flow path C provided from the discharging hole B disposed in the supporting member 5 to the rotor iron core 4, hit also the inner circumference of the stator winding 9, so that the stator 2 can also be cooled. Therefore, no oil path other than the flow path C needs to be provided in the rotor iron core 4.

Furthermore, one end of the partition plate 12 is welded to the end, of the supporting member 5, that is situated at the side of the discharging hole B formed in the cylinder section 5a, so that no separate member for fixing the partition plate 12 is not required and hence the number of components can be reduced; when whole-circumferential welding of the partition plate 12 makes it possible to secure the airtightness between the partition plate 12 and the cylinder section 5a of the supporting member 5, so that the cooling oil can more efficiently be utilized. Still moreover, because the axis-direction length can be fixed without being extended, the electric rotating machine 100 can be downsized. In addition, there exists an advantage that even when oil intrudes in the fixed portion, the fixing force is not liable to change.

In the foregoing description, there has been explained an embodiment in which one end of the partition plate 12 is welded to the end, of the supporting member 5, that is situated at the side of the discharging hole B formed in the cylinder section 5a; however, the one end of the partition plate 12 may be fixed in such a way as to be pressed into the inner radial portion of the cylinder section 5a of the supporting member 5. Even in this case, no separate member for fixing the partition plate 12 is required, so that the number of components can be reduced; in addition, the partition plate 12 can be fixed without extending the axis-direction length thereof, so that the electric rotating machine 100 can be downsized. Moreover, it is made possible to secure the airtightness between the partition plate 12 and the cylinder section 5a of the supporting member 5, so that the cooling oil can more efficiently be utilized.

Embodiment 2

Figure 2:
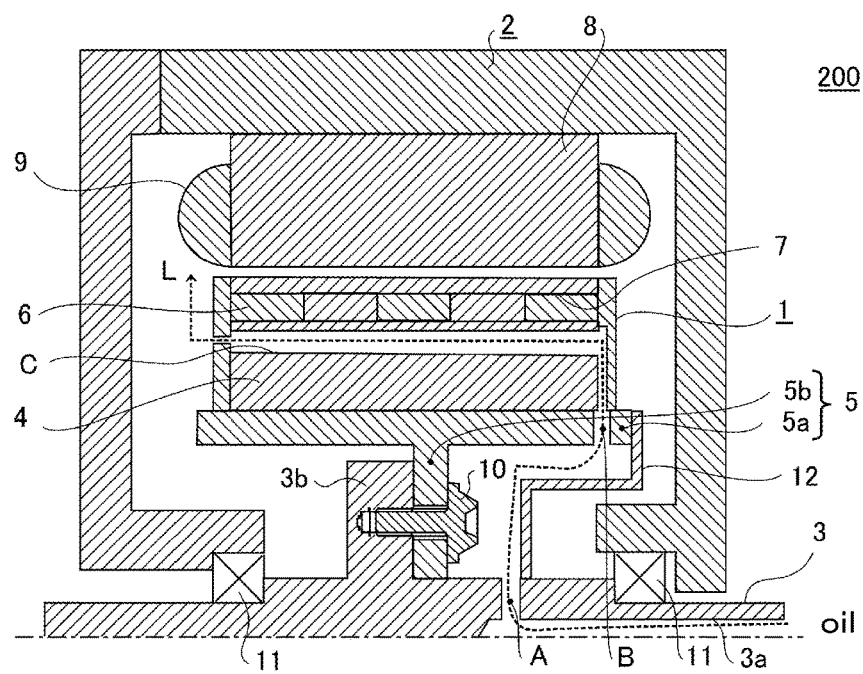
FIG. 2 is a cross-sectional view illustrating the configuration of an electric rotating machine according to Embodiment 2 of the present invention.

Next, an electric rotating machine according to Embodiment 2 of the present invention will be explained. FIG. 2 is a cross-sectional view illustrating the configuration of an electric rotating machine according to Embodiment 2. As illustrated in FIG. 2, in an electric rotating machine 200 according to Embodiment 2, as is the case with Embodiment 1, one end of the partition plate 12 is welded to the end, of the supporting member 5, that is situated at the side of the discharging hole B formed in the cylinder section 5a. Without forming any gap, the other end thereof is mounted on the rotation axle 3 so that cooling oil from the flow path hole A can be guided to the discharging hole B. In other words, there exists no gap in the space formed by the partition plate 12, the supporting member 5, and the rotation axle 3. Other configurations are the same as those in Embodiment 1; thus, the same reference numerals are designated therefor and the explanations therefor will be omitted.

In the electric rotating machine 200 according to Embodiment 2, all the cooling oil discharged from the flow path hole A flows into the discharging whole B; therefore, the cooling efficiency of the electric rotating machine 200 can further be raised.

Embodiment 3

Figure 3:
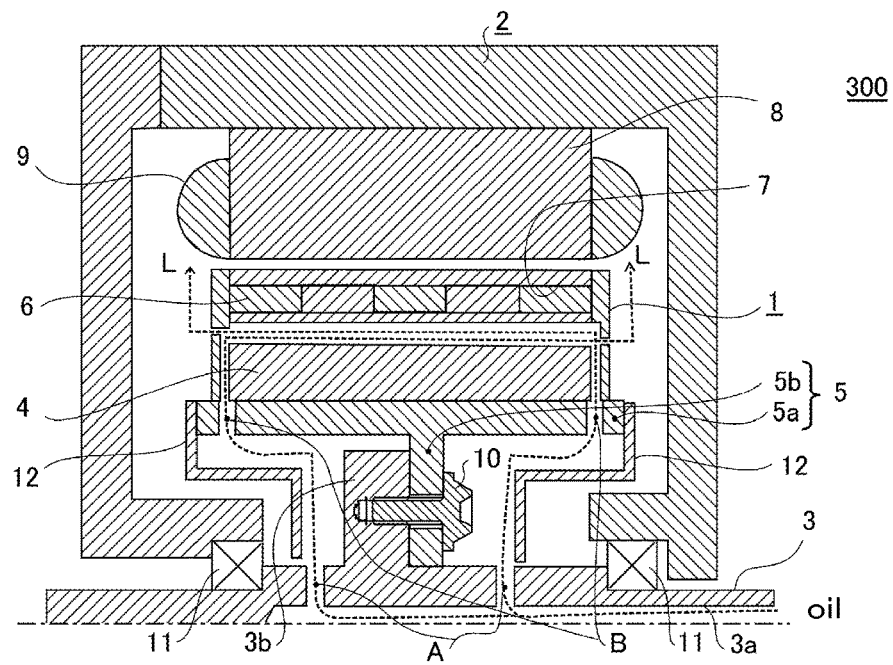
FIG. 3 is a cross-sectional view illustrating the configuration of an electric rotating machine according to Embodiment 3 of the present invention.

Next, an electric rotating machine according to Embodiment 3 of the present invention will be explained. FIG. 3 is a cross-sectional view illustrating the configuration of an electric rotating machine according to Embodiment 3. An electric rotating machine 300 according to Embodiment 3 has two flow path holes A through the protruding section 3b of the rotation axle 3 and two discharging holes B at the respective ends of the cylinder section 5a of the supporting member 5. Moreover, the partition plates 12 are provided at the respective ends of the cylinder section 5a of the supporting member 5; each of one ends of the partition plates 12 are mounted on the end, of the cylinder section 5a of the supporting member, that is situated at the side of the discharging hole B; each of the other ends thereof is mounted while forming a small gap between the rotation axle 3 and itself so that cooling oil from the flow path hole A can be guided to the discharging hole B. It may be allowed that as is the case with Embodiment 2, the other end of the partition plate 12 is mounted on the rotation axle 3 without forming a gap between the rotation axle 3 and itself so that the cooling oil from the flow path hole A can be guided to the discharging hole B. Other configurations are the same as those in Embodiment 1; thus, the same reference numerals are designated therefor and the explanations therefor will be omitted.

In the electric rotating machine 300 according to Embodiment 3, two flow path holes A are provided through the protruding section 3b of the rotation axle 3, two discharging holes B are provided at the respective ends of the cylinder section 5a of the supporting member 5, and two partition plates 12 are mounted at the respective ends of the cylinder section 5a of the supporting member 5; therefore, the cooling oil can circulate in such a manner as indicated by the two arrow in FIG. 3 and hence the rotor 1 can be cooled over the full length thereof.

There can be formed two spaces, through the disk section 5b, that are each enclosed by the cylinder section 5a and the disk section 5b of the supporting member 5; therefore, because the cooling oil can be stored in the two spaces, the cooling efficiency is raised. In addition, centrifugal force hits the cooling oil, which travels through the two discharging holes B provided in the supporting member 5 and passes through the flow path C provided in the rotor iron core 4, against the both sides of the stator winding 9; thus, cooling of the stator 2 is enhanced. In this case, it may be allowed that a rectifying device (unillustrated) for rectifying the flow of the cooling oil is provided in the flow path C so that the flow of the cooling oil that passes through the flow path C from the left side to the right side in FIG. 3 and the flow of the cooling oil that passes through the flow path C from the right side to the left side are separated from each other.

Embodiment 4

Figure 4:
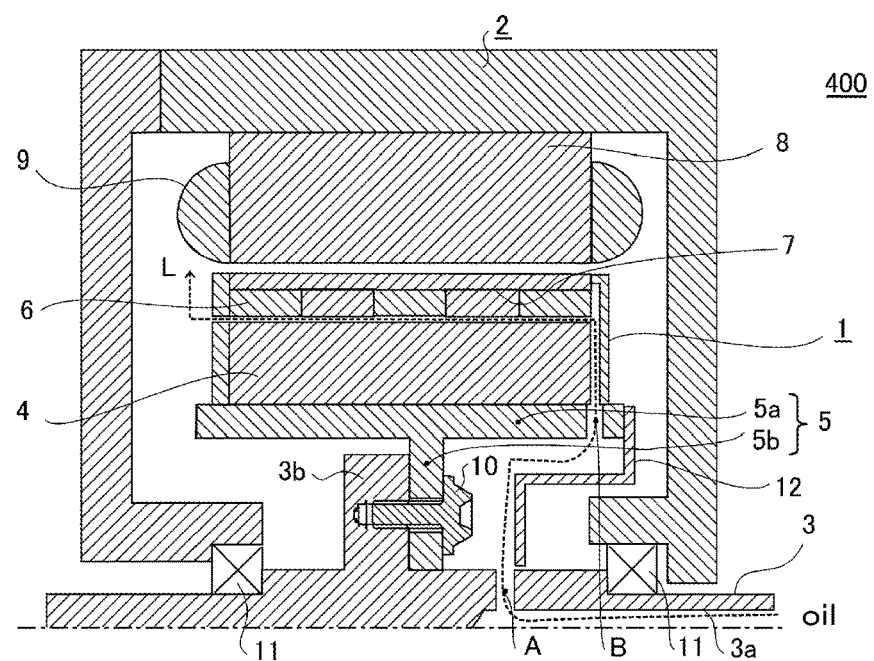
FIG. 4 is a cross-sectional view illustrating the configuration of an electric rotating machine according to Embodiment 4 of the present invention.

Next, an electric rotating machine according to Embodiment 4 of the present invention will be explained. FIG. 4 is a cross-sectional view illustrating the configuration of an electric rotating machine according to Embodiment 4. An electric rotating machine 400 according to Embodiment 4 is configured in such a way that the flow path C provided adjoining the magnet containing hole 7 of the rotor iron core 4 is removed and cooling oil that has passed through the flow path hole A and has entered the discharging hole B passes through the magnet containing hole 7 so as to cool the stator 2. Other configurations are the same as those in Embodiment 1; thus, the same reference numerals are designated therefor and the explanations therefor will be omitted.

The electric rotating machine 400 according to Embodiment 4 is configured in such away that the flow path C provided adjoining the magnet containing hole 7 of the rotor iron core 4 is removed and cooling oil that has passed through the flow path hole A and has entered the discharging hole B passes through the magnet containing hole 7 so as to cool the stator 2; therefore, there is demonstrated an effect that the magnets 6 can directly be cooled. For example, in the case of a large electric rotating machine to be mounted in an electric automobile or a hybrid automobile, an expensive rear-earth magnet, among magnets, that exerts strong magnetic force is utilized as the magnet 6. In order to raise the retentivity, a heavy rear-earth element is added to a rear-earth magnet. Embodiment 4 makes it possible to raise the cooling efficiency of the magnet, so that the expensive rear-earth element, which is included in the magnet and raises the retentivity, can be reduced; therefore, the cost can be diminished.

Embodiment 5

Figure 5:
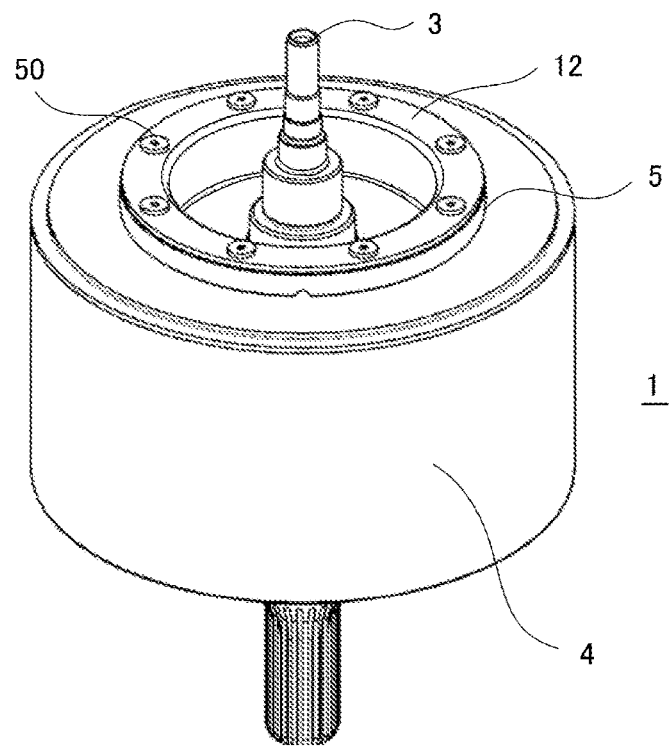
FIG. 5 is a perspective view illustrating a rotor of an electric rotating machine according to Embodiment 5 of the present invention.

Next, an electric rotating machine according to Embodiment 5 of the present invention will be explained. FIG. 5 is a perspective view illustrating a rotor of an electric rotating machine according to Embodiment 5. In an electric rotating machine according to Embodiment 5, the partition plate 12 is mounted by a screw 50 to the end of the cylinder section 5a of the supporting member 5. Other configurations are the same as those in Embodiment 1; thus, the same reference numerals are designated therefor and the explanations therefor will be omitted.

In the electric rotating machine according to Embodiment 5, the partition plate 12 is mounted and fixed by the screw 50 to the end of the cylinder section 5a of the supporting member 5; therefore, there is demonstrated an effect that even after having been mounted to the cylinder section 5a, the partition plate 12 can be detached. Moreover, because the detachment of the partition plate 12 does not require any special jig or tool, the cost of equipment can also be reduced.

Embodiment 6

Figure 6:
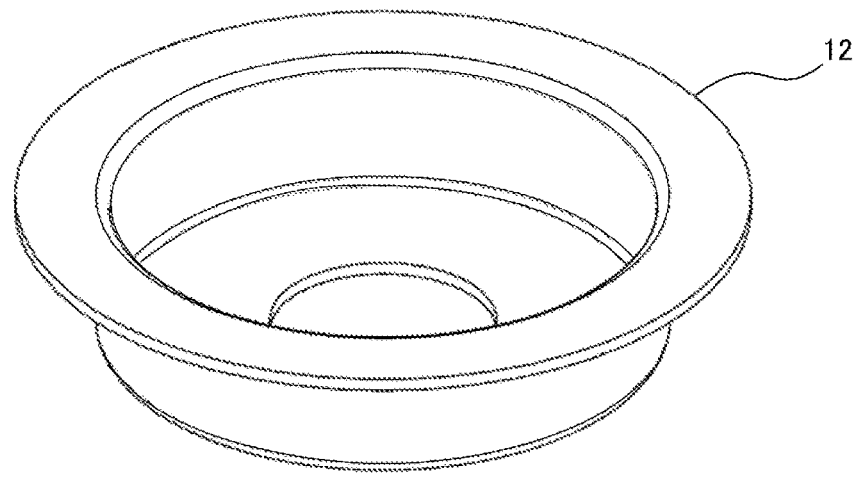
FIG. 6 is a perspective view illustrating a partition plate of an electric rotating machine according to Embodiment 6 of the present invention.

Next, an electric rotating machine according to Embodiment 6 of the present invention will be explained. FIG. 6 is a perspective view illustrating a partition plate of an electric rotating machine according to Embodiment 6. In the electric rotating machine according to Embodiment 6, the partition plate 12 is produced with a sheet metal material. Other configurations are the same as those in Embodiment 1; thus, drawing and explanations therefor will be omitted.

Because in the electric rotating machine according to Embodiment 6, the partition plate 12 is produced with a sheet metal material, the cost of the partition plate 12 can be reduced. Moreover, in the case where the partition plate 12 is fixed to the end of the cylinder section 5*a* of the supporting member 5, spot welding or the like can be utilized; therefore, the welding time can be shortened and hence the cost can be reduce.

Embodiment 7

Figure 7:
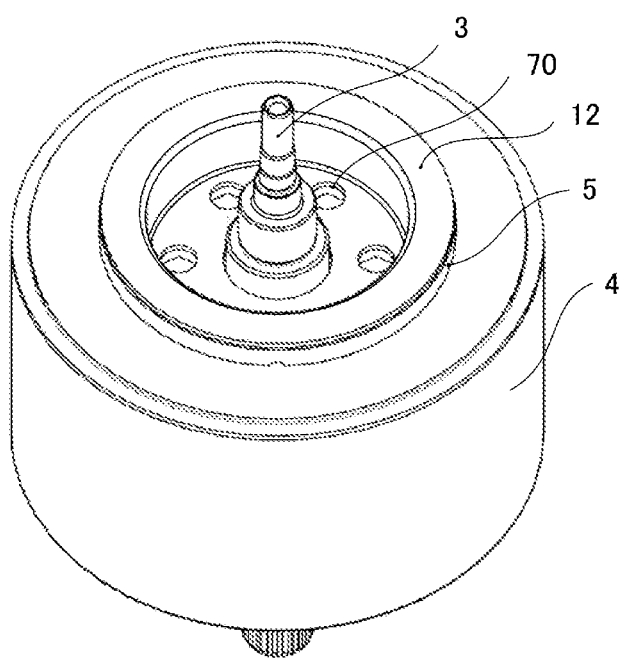
FIG. 7 is a perspective view illustrating a rotor of an electric rotating machine according to Embodiment 7 of the present invention.

Next, an electric rotating machine according to Embodiment 7 of the present invention will be explained. FIG. 7 is a perspective view illustrating a rotor of an electric rotating machine according to Embodiment 7. In the electric rotating machine according to Embodiment 7, a plurality of holes 70 are formed in the partition plate 12. Other configurations are the same as those in Embodiment 1; thus, the same reference numerals are designated therefor and the explanations therefor will be omitted.

In the electric rotating machine according to Embodiment 7, because a plurality of holes 70 are formed in the partition plate 12, it is made possible that with the partition plate 12 left fixed to the cylinder section 5*a* of the supporting member 5, the rotation axle 3 with the partition plate 12 and the rotor iron core 4 can be separated from each other by removing the bolts (unillustrated) for fixing them. Moreover, when the number of the holes 70 is made to be the same as the number of the bolts and is made to be a multiple of the number of the flow path holes formed in the rotation axle 3, it is made possible that while the weight of the partition plate 12 is saved, the function of controlling the oil path is prevented from being hindered.

Heretofore, Embodiments 1 through 7 of the present invention have been explained; however, the present invention is not limited thereto; in the scope within the spirits of the present invention, the configurations thereof can appropriately be combined with one another, modified, or omitted.

What is claimed is:

1. An electric rotating machine having a rotor including:
   a rotation axle;
   a rotor iron core that is situated at an outer circumference of the rotation axle and in which magnets are mounted; and
   a supporting member that is disposed at an outer circumference of the rotation axle and couples and supports the rotor iron core with the rotation axle,
   wherein in the rotation axle, there are provided an oil flow path having a predetermined length from an end of the rotation axle and a flow path hole that communicates with the oil flow path and has an opening toward the inside of the electric rotating machine,
   wherein the supporting member includes a cylinder section and a disk section that partitions the cylinder section in the axis direction, and a discharging hole is provided at an end of the cylinder section,
   wherein between the flow path hole and the discharging hole, there is provided a partition member that encloses a space formed by the supporting member and the rotation axle, said partition member and supporting member defining a cooling oil path guiding cooling oil from the flow path hole to the inside of the electric rotating machine to the discharging hole, and
   wherein one end of the partition member is mounted to the end of the cylinder section in which the discharging hole is provided.

2. The electric rotating machine according to claim 1, wherein a magnet containing hole for containing the magnets is formed in the rotor iron core, and the cooling oil guided to the discharging hole passes through the magnet containing hole.

3. The electric rotating machine according to claim 1, wherein one end of the partition member is screwed to the end, of the cylinder section, that is situated at the side of the discharging hole.

4. The electric rotating machine according to claim 1, wherein one end of the partition member is welded to the end, of the cylinder section, that is situated at the side of the discharging hole.

5. The electric rotating machine according to claim 1, wherein one end of the partition member is pressed into the end, of the cylinder section, that is situated at the side of the discharging hole.

6. The electric rotating machine according to claim 1, wherein the partition member is produced with a sheet metal material.

7. The electric rotating machine according to claim 1, wherein a plurality of holes are formed in the partition member.

8. The electric rotating machine according to claim 7, wherein the holes are formed to pass through said partition in an axial direction of said rotation axle.

9. The electric rotating machine according to claim 7, wherein the holes are formed in a portion of said partition that runs generally parallel to said disk section.

10. The electric rotating machine according to claim 7, wherein each of said plurality of holes aligns with an exposed head of a respective bolt in an adjacent structure of the rotor.

11. The electric rotating machine according to claim 1, wherein an inner radial end of said partition member is mounted spaced apart from the rotation axle.

12. The electric rotating machine according to claim 1, an inner radial end of said partition member is mounted to the rotation axle so that there exists no gap for outflow of said cooling oil from the space formed by the supporting member, the partition member, and the rotation axle, other than through said discharging hole.

13. The electric rotating machine according to claim 1, wherein said rotor iron core includes an internal flow path for carrying said cooling oil, said internal flow path including a first flow path portion extending radially from said discharging hole, and a second flow path portion extending in an axial direction of said rotor.

14. The electric rotating machine according to claim 13, wherein said first flow path portion connects to one axial end of said second flow path portion.

* * * * *